(12) United States Patent
Park et al.

(10) Patent No.: US 9,625,758 B2
(45) Date of Patent: Apr. 18, 2017

(54) LIQUID CRYSTAL DISPLAY DEVICE

(71) Applicant: SAMSUNG DISPLAY CO., LTD., Yongin-si, Gyeonggi-do (KR)

(72) Inventors: Seung Hyun Park, Seoul (KR); Hyang Yul Kim, Hwaseong-si (KR); Jun Ho Song, Seongnam-si (KR); Jean Ho Song, Yongin-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 14/668,872

(22) Filed: Mar. 25, 2015

(65) Prior Publication Data

US 2016/0062169 A1 Mar. 3, 2016

(30) Foreign Application Priority Data

Aug. 26, 2014 (KR) .................. 10-2014-0111498

(51) Int. Cl.
*G02F 1/1335* (2006.01)
*G02F 1/1343* (2006.01)
*G02F 1/1333* (2006.01)

(52) U.S. Cl.
CPC .. *G02F 1/133514* (2013.01); *G02F 1/133371* (2013.01); *G02F 1/134363* (2013.01); *G02F 2001/133368* (2013.01); *G02F 2001/134372* (2013.01)

(58) Field of Classification Search
USPC ......................................... 349/109
See application file for complete search history.

(56) References Cited

U.S. PATENT DOCUMENTS

| | | | | |
|---|---|---|---|---|
| 7,808,595 B2* | 10/2010 | Chae | ................ | G02F 1/134363 349/106 |
| 8,130,344 B2* | 3/2012 | Tsuchiya | ........... | G02F 1/133514 349/107 |
| 2005/0270449 A1* | 12/2005 | Koma | ............... | G02F 1/133371 349/114 |
| 2006/0066780 A1* | 3/2006 | Ochiai | ............. | G02F 1/133371 349/107 |
| 2009/0207349 A1 | 8/2009 | Yoshimi et al. | | |

FOREIGN PATENT DOCUMENTS

| | | |
|---|---|---|
| JP | 2002-082357 A | 3/2002 |
| KR | 10-2003-0081905 A | 10/2003 |
| KR | 10-2004-0081821 A | 9/2004 |
| KR | 10-2009-0014271 A | 2/2009 |

\* cited by examiner

*Primary Examiner* — Wen-Ying P Chen
(74) *Attorney, Agent, or Firm* — Innovation Counsel LLP

(57) ABSTRACT

An LCD device includes: a first substrate; a gate line and a data line on the first substrate; at least one TFT connected to the gate and data lines and comprising source and drain electrodes; a pixel electrode connected to the TFT; a second substrate; a liquid crystal layer between the first and second substrates; a common electrode on one of the first and second substrates; a black matrix disposed on one of the first and second substrates and configured to at least partially define a pixel region; a color filter disposed to correspond to the pixel region; and a cell gap adjustment layer disposed on one of the first and second substrates and positioned so as to form different cell gaps within one pixel region.

13 Claims, 9 Drawing Sheets

LIQUID CRYSTAL DISPLAY DEVICE

CROSS-REFERENCE TO RELATED APPLICATION

This application claims priority to, and the benefit of, Korean Patent Application No. 10-2014-0111498, filed on Aug. 26, 2014 with the Korean Intellectual Property Office, the disclosure of which is incorporated herein in its entirety by reference.

BACKGROUND

1. Field

Aspects of embodiments of the present invention relate generally to liquid crystal displays. More specifically, aspects of embodiments of the present invention relate to liquid crystal display devices capable of adjusting chromaticity coordinates.

2. Description of the Related Art

A liquid crystal display (LCD) device is a type of flat panel display (FPD) which has found wide recent acceptance. The LCD includes two substrates having electrodes formed thereon and a liquid crystal layer interposed therebetween. Upon applying voltage to the electrodes, liquid crystal molecules of the liquid crystal layer are rearranged, thereby adjusting the amount of transmitted light so as to form a desired image.

It is relatively easy to achieve a slim structure in an LCD. However, the LCD may have disadvantageously lower side visibility than front visibility. In order to avoid such a drawback, various kinds of liquid crystal arrangements and driving methods have been developed. As one example, a plane to line switching (PLS) mode has been developed, in which a pixel electrode and a common electrode are formed on one substrate so as to realize a wide viewing angle.

In the meantime, an LCD in PLS mode requires an accurate color capture (ACC) compensation process in order to maintain color balance thereof. However, the ACC compensation process may cause a yellowish phenomenon on the LCD screen.

In order to avoid this yellowish phenomenon, a method has been suggested where thicknesses of color filters are differently adjusted in accordance with a corresponding color. In this case, the characteristics of the color filters may, however, be changed in accordance with the changed thickness, which may result in a further need for a new color-filter material.

It is to be understood that this background of the technology section is intended to provide useful background for understanding the technology and as such disclosed herein, the technology background section may include ideas, concepts or recognitions that were not part of what was known or appreciated by those skilled in the pertinent art prior to a corresponding effective filing date of subject matter disclosed herein.

SUMMARY

The present disclosure of invention is directed in some aspects to an LCD device capable of adjusting chromaticity coordinates without inducing a change in characteristics of a color filter.

According to an embodiment of the present invention, an LCD device includes: a first substrate; a gate line and a data line on the first substrate; at least one TFT connected to the gate and data lines and comprising source and drain electrodes; a pixel electrode connected to the TFT; a second substrate; a liquid crystal layer between the first and second substrates; a common electrode on one of the first and second substrates; a black matrix disposed on one of the first and second substrates and configured to at least partially define a pixel region; a color filter disposed to correspond to the pixel region; and a cell gap adjustment layer disposed on one of the first and second substrates and positioned so as to form different cell gaps within one pixel region.

The cell gap adjustment layer may have different thicknesses in the one pixel region.

The cell gap adjustment layer may be disposed only on a part of the one pixel region.

Multiple pixel regions may be present. The cell gap adjustment layer may have different thicknesses in different pixel regions.

The cell gap adjustment layer may not be disposed on, or absent from, at least one pixel region.

The cell gap adjustment layer may comprise a material different from that of the color filter.

The cell gap adjustment layer may comprise one of metal, organic, and inorganic materials.

The black matrix, the color filter, and the common electrode may be disposed on the second substrate.

The black matrix and the color filter may be disposed on the second substrate, the common electrode may be disposed on the first substrate; and the pixel electrode may include a plurality of branch electrodes.

The LCD device may further include an insulating film between the pixel electrode and the common electrode.

The LCD device may further include a coupling prevention film between the data line and the common electrode.

The coupling prevention film and the cell gap adjustment layer may comprise the same material.

The black matrix, the color filter, and the common electrode may be disposed on the first substrate.

According to embodiments of the present invention, an LCD device may correct chromaticity coordinates by adjusting a cell gap in accordance with a corresponding pixel region using a cell gap adjustment layer, thereby maintaining color balance.

The foregoing is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The above and other features and aspects of the present disclosure of invention will be more clearly understood from the following detailed description taken in conjunction with the accompanying drawings, in which.

DETAILED DESCRIPTION

Figure 1:
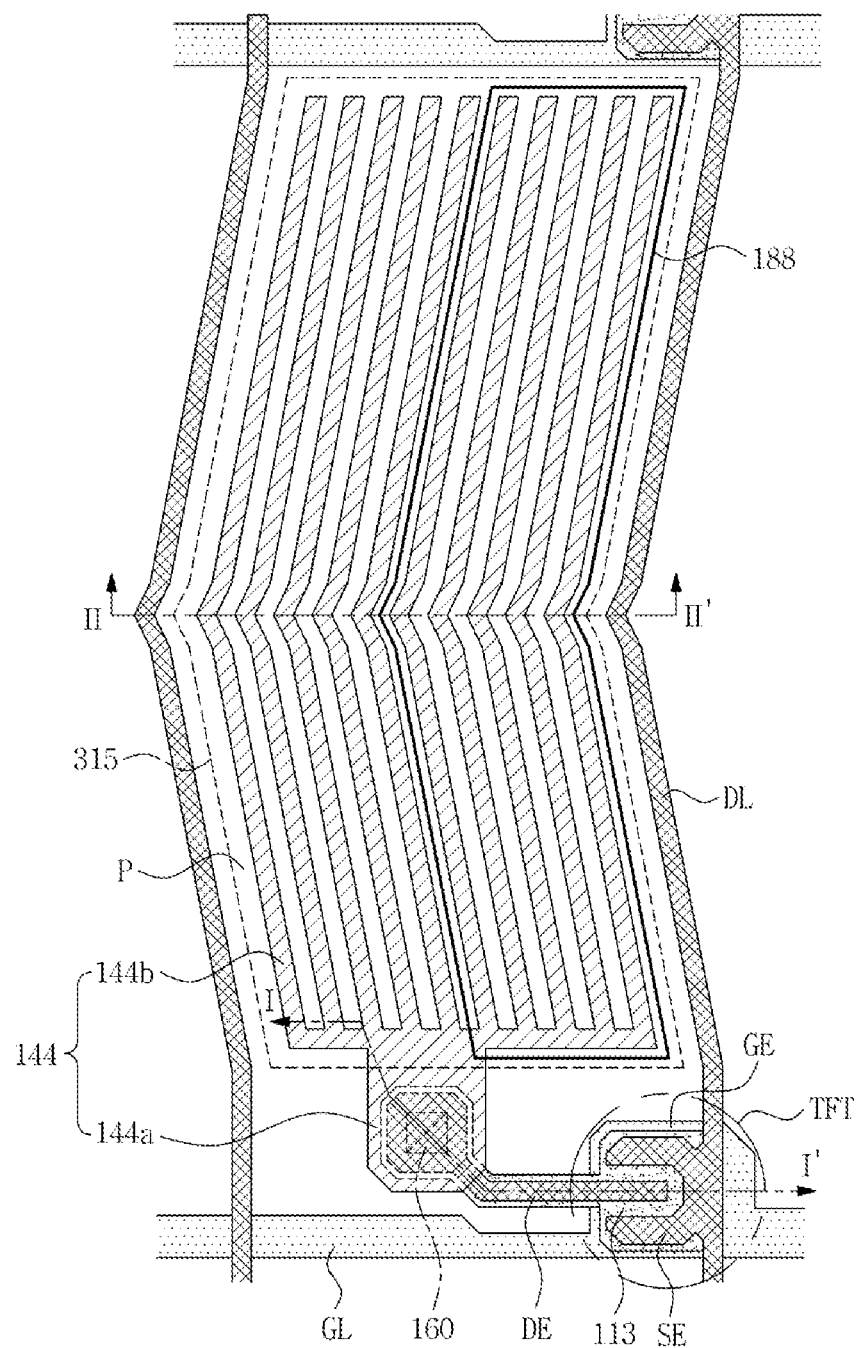
FIG. 1 is a plan view illustrating an LCD device according to one embodiment of the present invention.

Advantages and features of the present invention and methods for achieving them will be made clear from embodiments described below in detail with reference to the accompanying drawings. The present invention may, however, be embodied in many different forms and should not be construed as being limited to the embodiments set forth herein. Rather, these embodiments are provided so that this disclosure will be thorough and complete, and will fully convey the scope of the invention to those skilled in the art. The present invention is merely defined by the scope of the claims. Therefore, well-known constituent elements, operations and techniques are not described in detail in the embodiments in order to prevent the present invention from being obscurely interpreted. Like reference numerals refer to like elements throughout the specification. The various Figures are not necessarily to scale.

The spatially relative terms "below", "beneath", "lower", "above", "upper", and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device shown in the drawing is turned over, the device positioned "below" or "beneath" another device may be placed "above" another device. Accordingly, the illustrative term "below" may include both the lower and upper positions. The device may also be oriented in the other direction, and thus the spatially relative terms may be interpreted differently depending on the orientations.

Throughout the specification, when an element is referred to as being "connected" to another element, the element is "directly connected" to the other element, or "electrically connected" to the other element with one or more intervening elements interposed therebetween. With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

Figure 2:
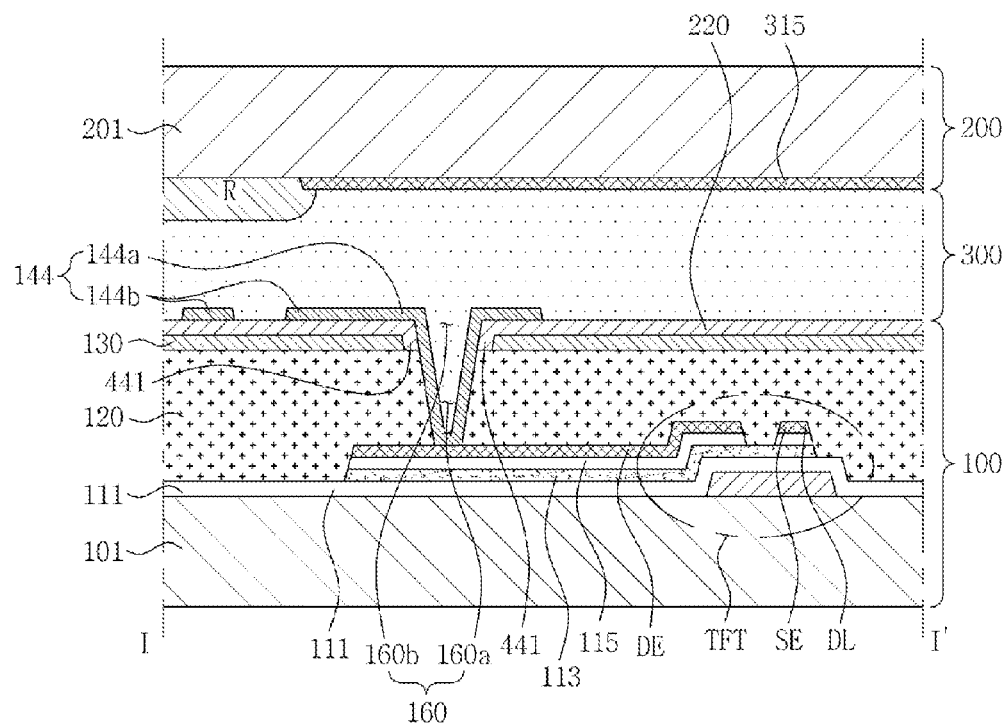
FIG. 2 is a cross-sectional view taken along a line I-I' of FIG. 1.
Figure 3:
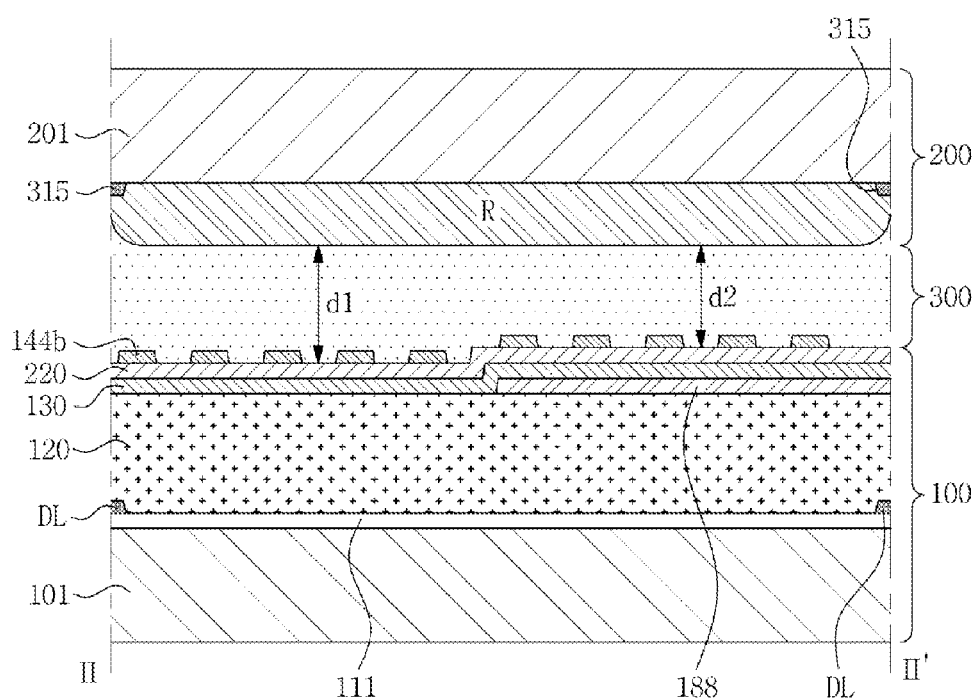
FIG. 3 is a cross-sectional view taken along a line II-II' of FIG. 1.

FIG. 1 is a plan view illustrating an LCD device according to one embodiment of the present invention, FIG. 2 is a cross-sectional view taken along a line I-I' of FIG. 1, and FIG. 3 is a cross-sectional view taken along a line II-II' of FIG. 1.

Referring to FIGS. 1 to 3, the LCD device according to one embodiment of the present invention may include a lower panel 100 and an upper panel 200 disposed to face each other with a liquid crystal layer 300 interposed therebetween.

Exemplary Embodiment 1

Hereinafter, the lower panel 100 will be described.

As illustrated in FIGS. 1 to 3, the lower panel 100 may include a lower substrate 101, a gate line GL, a gate electrode GE, a gate insulating film 111, a semiconductor layer 113, an ohmic contact layer 115, a source electrode SE, a drain electrode DE, a thin film transistor (TFT), a data line DL, a first protective layer 120, a common electrode 130, a cell gap adjustment layer 188, a second protective layer 220, and a pixel electrode 144.

The lower substrate 101 may be an insulating substrate made of a transparent material, such as glass and/or many plastics.

The gate line GL and the gate electrode GE may be disposed on the lower substrate 101. Although not illustrated, the gate line GL may have a connecting portion (e.g., an end portion) larger than other portions thereof in size, such that the gate line GL can be connected to another layer or external driving circuits. The gate line GL may be made of metal including, for example, one of aluminum (Al), silver (Ag), copper (Cu), and molybdenum (Mo) or a metal alloy thereof. Further, the gate line GL may be made of, for example, one of chromium (Cr), tantalum (Ta) and titanium (Ti). Meanwhile, the gate line GL may have a multi-layer structure including at least two conductive layers that have physical properties different from each other.

The gate electrode GE may branch out or extend from the gate line GL. As illustrated in FIG. 2, the gate electrode GE may protrude toward the pixel region P. The gate electrode GE may be made of the same material and have the same structure (a multiple membrane structure) as the gate line GL. That is, the gate electrode GE and the gate line GL may be simultaneously formed in the same process.

The gate insulating film 111 may be disposed on the gate line GL and the gate electrode GE. In this case, the gate insulating film 111 may be formed over the entire surface of the lower substrate 191, including the gate line GL and the gate electrode GE. The gate insulating film 111 may be made of, for example, silicon nitride (SiNx), silicon oxide (SiOx), and the like. The gate insulating film 111 may have a multi-layer structure including at least two insulating films that have physical properties different from each other.

The semiconductor layer 113 may be formed on the gate insulating film 111. In this case, the semiconductor layer 113 may overlap a part of the gate electrode GE. The semiconductor layer 113 may be made of, for example, amorphous silicon, polycrystalline silicon, and the like.

The ohmic contact layer 115 may be formed on the semiconductor layer 113. The ohmic contact layer 115 may be made of, for example, n+hydrogenated amorphous silicon highly doped with n-type impurities such as phosphorus or silicide. The ohmic contact layer 115 may be disposed on the semiconductor layer 113 in pairs, i.e. under both the source and drain electrodes SE and DE.

The source and drain electrodes SE and DE may be disposed on the ohmic contact layer 115.

The source electrode SE may branch out from the data line DL and may protrude toward the gate electrode GE, as illustrated in FIG. 1. In this case, the source electrode SE may have an inverted C-form surrounding a part of the drain electrode DE. That is, in the view of FIG. 1, the source electrode SE is shaped like a backwards "C", with two protrusions extending along top and bottom sides of the drain electrode DE. At least a part of the source electrode SE may overlap the semiconductor layer 113 and the gate electrode GE. Meanwhile, the source electrode may have one of a C-form, a U-form, and an inverted U-form, rather than the inverted C-form.

In some applications, it is desirable that the source electrode is made of refractory metal such as molybdenum, chromium, tantalum and titanium or a metal alloy thereof, and may have a multi-layer structure including a refractory metal film and a low-resistance conductive film. Examples of the multi-layer structure include: a double-layer structure including a chromium or molybdenum (alloy) lower film and an aluminum (alloy) upper film; and a triple-layer structure including a molybdenum (alloy) lower film, an aluminum (alloy) intermediate film, and a molybdenum (alloy) upper film. Further, the source electrode SE may be formed of various metal or conductive materials other than the above-described materials.

One side of the drain electrode DE may be connected to the pixel electrode 144. A part of the other side of the drain electrode DE may overlap the semiconductor layer 113 and the gate electrode GE. The drain electrode DE may be made of the same material and have the same structure (a multi-layer structure) as the source electrode SE. That is, the drain electrode DE and the source electrode SE may be simultaneously formed in the same process.

The gate, source, and drain electrodes GE, SE, and DE together form the TFT along with the semiconductor layer 113. In this case, a channel of the TFT may be formed on the semiconductor layer 113 portion between the source and drain electrodes SE and DE.

The data line DL may be formed on the gate insulating film 111. Although not illustrated, the data line DL may have a connecting portion (e.g., an end portion) larger than other portions thereof in size, such that the data line DL can be connected to another layer or external driving circuits.

The data line DL may be configured to transmit a data signal and may extend in its length direction to intersect the gate line GL. In this case, a center portion of the data line DL may be bent into a V-shape (when viewed in plan view, as can be seen in FIG. 1), so that the LCD device can have a greater transmittance. The data line DL may be made of the same material and have the same structure (a multi-layer structure) as the source electrode SE. That is, the drain line DL and the source electrode SE may be simultaneously formed in the same process.

The first protective layer 120 may be disposed on the data line DL, the source electrode SE, and the drain electrode DE. In this case, the first protective layer 120 may be formed over the entire surface of the lower substrate 101 including the data line DL, the source electrode SE, and the drain electrode DE. The first protective layer 120 may be formed of, for example, inorganic insulating materials such as silicon nitride (SiNx) and silicon oxide (SiOx). In the case where the first protective layer 120 is made of an inorganic insulating material, an inorganic material having photosensitivity and a dielectric constant of about 4.0 may be used. The first protective layer 120 may also have a double layer structure including a lower inorganic layer and an upper organic layer, which has been found to impart desirable insulating properties and also to prevent damage to exposed portions of the semiconductor layer 113. As examples, the first protective layer 120 may have a thickness of about 5000 Å or more and may be about 6000 Å to about 8000 Å.

A lower contact hole 160a may be formed to extend through the first protective layer 120. A part of the drain electrode DE may be exposed through the lower contact hole 160a.

As illustrated in FIGS. 1 and 3, a cell gap adjustment layer 188 may be formed on the first protective layer 120. In this case, two different cell gaps may be formed in one pixel region by the cell gap adjustment layer 188. That is, a pixel region P in which the red color filter R is disposed may have two differently sized cell gaps due to the cell gap adjustment layer 188.

For example, as illustrated in FIG. 3, a cell gap d1 between the lower substrate 101 and the upper substrate 201 in an area where the cell gap adjustment layer 188 has a thickness of 0 may be different from a cell gap d2 between the lower substrate 101 and the upper substrate 201 in an area where the cell gap adjustment layer 188 has a predetermined thickness larger than 0. In other words, the cell-gap adjustment layer 188 may be disposed only on a part of one pixel region, so that one pixel region may have two different cell gaps d1 and d2.

Accordingly, the transmittance of the red color filter R may be adjusted. That is, the transmittance of the red color filter R may be adjusted in accordance with the thickness of the cell gap adjustment layer 188.

Meanwhile, the cell gap adjustment layer 188 may be formed over the entirety of a pixel region P on which green and blue color filters G and B are formed. The cell gap adjustment layer 188 may be made of a material used for the first protective layer 120. Embodiments of the invention contemplate any distribution of cell gap adjustment layers 188 within any pixel regions. That is, the cell gap adjustment layers 188 may be formed in any part of, or the entirety of, any pixel regions.

As described above, according to one embodiment of the present invention, the thickness of the cell gap adjustment layer 188 may be suitably adjusted in accordance with a corresponding color filter. That is, the thickness may vary by color of the corresponding color filter. Accordingly, the chromaticity coordinates may be corrected, thereby helping to maintain color balancing. Further, according to one embodiment of the present invention, one pixel region P on which one color filter is disposed may have at least two differently sized cell gaps, thereby enabling subtle adjustment on one color filter.

On the first protective layer 120, the common electrode 130 may be disposed to cover the entire surface of the lower substrate 101 including the cell gap adjustment layer 188. That is, the common electrode 130 may be formed on substantially the entire surface of the lower substrate 101 including the first protective layer 120 and the cell gap adjustment layer 188. However, as illustrated in FIG. 2, an opening may be formed passing through a part of the common electrode 130. The opening may be disposed over and concentric with the lower contact hole 160a. The opening may have a size sufficient to surround the lower contact hole 160a and an upper contact hole described below. A part of the drain electrode DE may be exposed through the opening and the lower contact hole 160a. The common electrode 130 may be made of, for example, a material used for the gate line GL or the data line DL.

On the common electrode 130, a second protective layer 220 may be disposed to cover the whole surface of the lower substrate 101. That is, the second protective layer 220 may be formed on substantially the entire surface of the lower substrate 101 including the common electrode 130. The second protective layer 220 may be made of, for example, a material used for the first protective layer 120.

The upper contact hole 160b may be formed through the second protective layer 220 and this upper contact hole 160b may be formed over and concentric with the opening in common electrode 130. The lower and upper contact holes 160a and 160b may be connected through the opening to form one drain contact hole 160.

Herein, the drain contact hole 160 may be formed as follows. After being formed on the first protective layer 120, the common electrode 130 may be partially removed to form the opening by photolithography and/or etching processes. The first protective layer 120 may thus be exposed through the opening. Next, the second protective layer 220 may be formed on the whole surface of the lower substrate 101 including the common electrode 130 on which the opening is formed. In this case, a part of the second protective layer 220 may be brought into contact with the first protective layer 120 that is exposed through the opening. Subsequently, the first and second protective layers 120 and 220 disposed in the opening may be selectively removed to form the drain contact hole 160, such as by photolithography and etching processes. In this case, the photolithography and etching process should be performed so that the drain contact hole 160 may be sufficiently surrounded by the opening, which assures that the exposed surface of the common electrode 130, that is, an inner wall of the opening, may be sufficiently covered by the second protective layer 220. Accordingly, a short circuit may be prevented between the common electrode 130 and the pixel electrode 144 later inserted into the drain contact hole 160.

The pixel electrode 144 and the common electrode 130 may together form a horizontal electric field. The pixel electrode 144 may include a connecting unit 144a and a plurality of branch lines 144b branching out from the connecting unit 144a. The connecting unit 144a may be disposed in the drain contact hole 160, and the connecting unit 144a may be connected to the drain electrode DE exposed through the drain contact hole 160. The plurality of branch lines 144b may be disposed on the pixel region P. The horizontal electric field may be generated between the branch lines 144b (i.e., a line electrode) and the common electrode 130 (i.e., a surface electrode). The branch lines 144b may extend in substantially the same direction as the data line DL. A center portion of the branch line 144b may be bent into a V-shape. Meanwhile, the branch line 144b may further extend outwards from the pixel region P.

The pixel electrode 144 may be formed of, for example, a transparent conductive material, such as indium tin oxide (ITO) and indium zinc oxide (IZO). In this case, the ITO may be polycrystalline or monocrystalline. Further, the IZO may also be polycrystalline or monocrystalline.

In the meantime, as illustrated in FIG. 2, a portion 441 of the second protective layer 220 may be disposed between the pixel electrode 144 and the exposed surface of the common electrode 130 that forms an inner wall of the opening, thereby preventing a short circuit between the pixel electrode 144 and the common electrode 130.

Next, the upper panel 200 will be described.

As illustrated in FIGS. 1 to 3, the upper panel 200 may include a black matrix 315 and a color filter. Although not illustrated, the upper panel 200 may further include an overcoat layer formed on the entire surface of the substrate including the color filter.

The upper substrate 201 may be an insulating substrate made of, for example, a transparent material such as glass and plastics.

The black matrix 315 may be disposed on the upper substrate 201. The black matrix 314 may block light leakage from areas other than the pixel region P. The areas other than the pixel region P may include, for example, a disclination area where the liquid crystals may not be well controlled due to an abnormal horizontal electric field.

The color filter may include red, green, and blue color filters R, G, and B, or filters of any other color. Each of the color filters R, G, and B may be disposed on areas of the upper substrate 201 not hidden by the black matrix 315, that is, areas corresponding to the pixel region P. In this case, an edge portion of each color filter R, G, and B may be partially disposed on the black matrix 315. That is, the color filters may partially overlap adjacent portions of black matrix 315.

The liquid crystal layer 300 may include a nematic liquid crystal material having a positive dielectric anisotropy. In the liquid crystal layer 300, a major axis of the liquid crystal molecules may be aligned in parallel with one of the upper panel 200 and the lower panel 100. Further, the liquid crystal molecules may be twisted 90 degrees from a rubbing direction of an alignment layer of the lower panel 100 to the upper panel 200. In addition, the liquid crystal layer 300 may include a vertically aligned liquid crystal material rather than the nematic liquid crystal material.

Meanwhile, the cell gaps of three pixel regions P1, P2 and P3 adjacent to each other may be differently structured, which will be described in more detail with reference to FIGS. 4 and 5.

Figure 4:
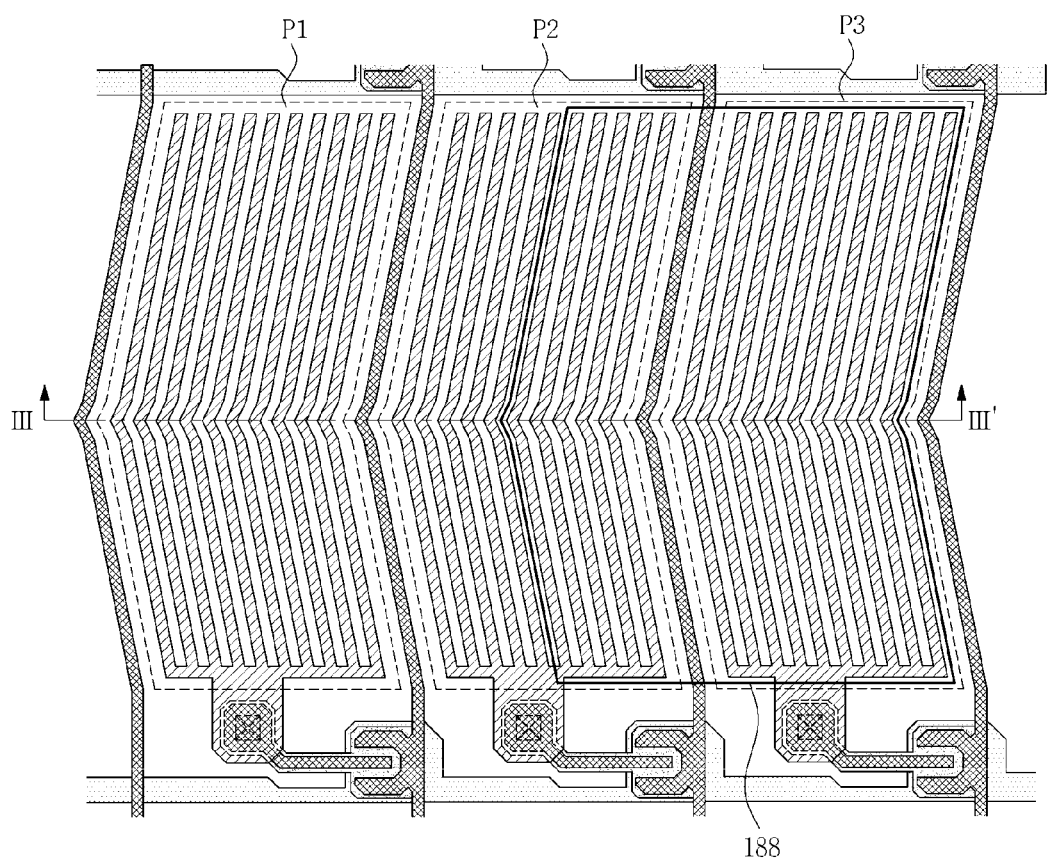
FIG. 4 is a plan view illustrating three adjacent pixel regions including a pixel region of FIG. 1.

FIG. 4 is a plan view illustrating three pixel regions P1-P3 adjacent to each other and including the pixel region P described in FIG. 1. FIG. 5 is a cross-sectional view taken along a line III-III' of FIG. 4.

Figure 5:
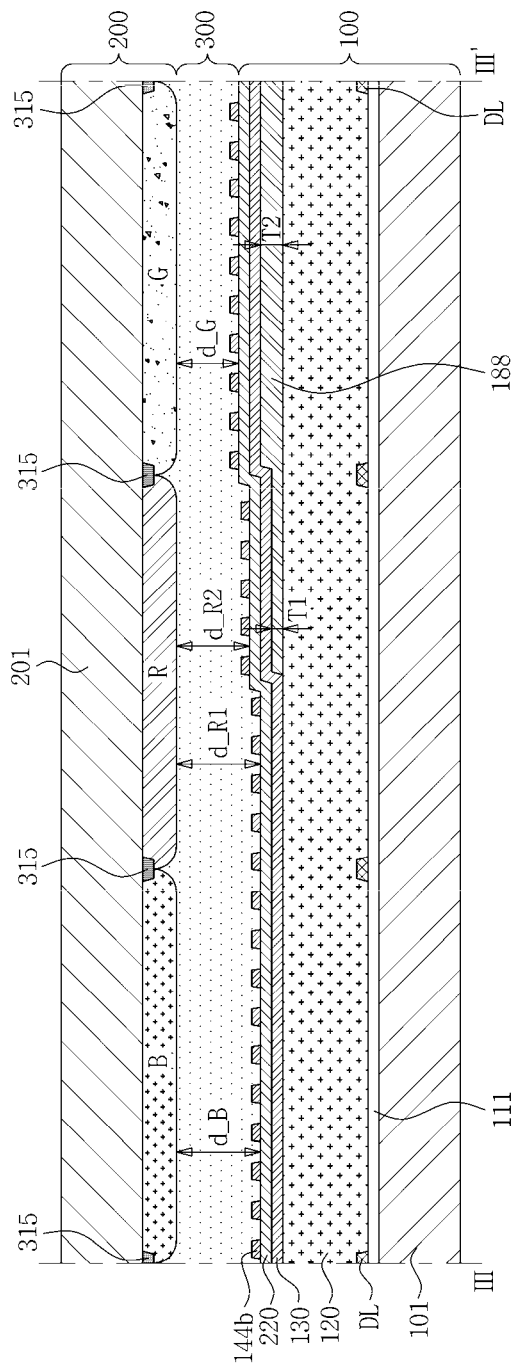
FIG. 5 is a cross-sectional view taken along a line III-III' of FIG. 4.

As illustrated in FIGS. 4 and 5, the cell gap adjustment layer 188 may have different thicknesses in different pixel regions. In more detail, the cell gap adjustment layer 188 in the first pixel region P1 in which the blue color filter B is disposed may have a thickness of 0, the cell gap adjustment layer 188 in a part of the second pixel region P2 in which the red color filter R is disposed may have a thickness of 0, the cell gap adjustment layer 188 in the other part of the second pixel region P2 may have a predetermined thickness larger than 0, and the third pixel region P3 in which the green color filter G is disposed may have a thickness larger than the predetermined thickness. Herein, the cell gap adjustment layer 188 may not be actually provided on the first pixel region P1 or the second pixel region P2. That is, the adjustment layer 188 may be absent from pixel regions P1 and P2.

Accordingly, the cell gap d_B may be the largest in the first pixel region P1 in which the blue color filter B is disposed and the cell gap d_G may be the smallest in the third pixel region P3 in which the green color filter G is disposed. Further, part of the cell gap d_R1 in the second pixel region P2 in which the red color filter R is disposed may be the same as the cell gap d_B in the first pixel region P1. Further, the other part of cell gap d_R2 in the second pixel region P2 may be larger than the cell gap d_B in the first pixel region P1 and smaller than the cell gap d_G in the third pixel region P3.

Meanwhile, one layer may be made into the cell gap adjustment layers 188 having different thicknesses by a diffraction exposure process using a half tone mask.

Exemplary Embodiment 2

Figure 6:
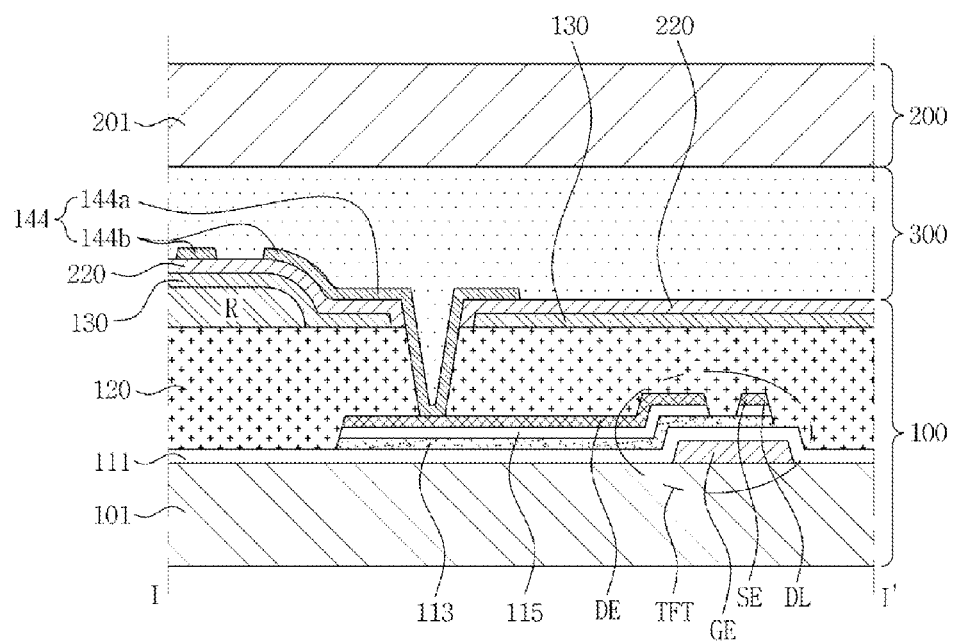
FIG. 6 is a cross-sectional view taken along the line I-I' of FIG. 1 according to another embodiment of the present invention.
Figure 7:
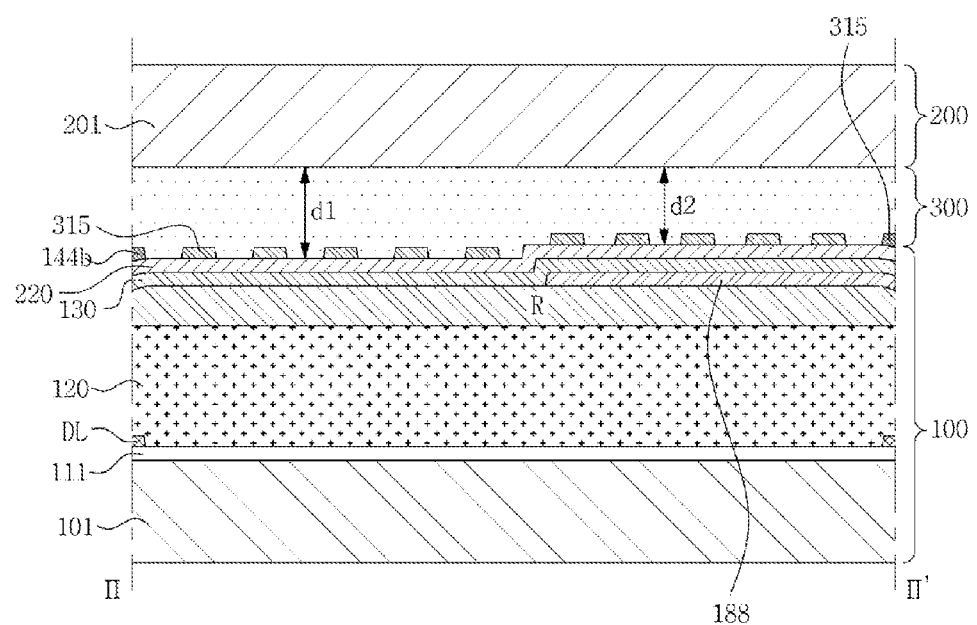
FIG. 7 is a cross-sectional view taken along the line II-II' of FIG. 1 according to another embodiment of the present invention.

FIG. 6 is a cross-sectional view taken along the line I-I' of FIG. 1 according to another embodiment of the present invention and FIG. 7 is a cross-sectional view taken along the line II-II' of FIG. 1 according to another embodiment of the present invention.

Referring to FIGS. 1, 6, and 7, an LCD device according to another embodiment of the present invention may include a lower panel 100 and an upper panel 200 disposed to face each other with a liquid crystal layer 300 interposed therebetween.

As illustrated in FIGS. 1, 6, and 7, the lower panel 100 may include a lower substrate 101, a gate line GL, a gate electrode GE, a gate insulating film 111, a semiconductor layer 113, an ohmic contact layer 115, a source electrode SE, a drain electrode DE, a thin film transistor (TFT), a data line DL, a first protective layer 120, a color filter, a common electrode 130, a cell gap adjustment layer 188, a second protective layer 220, a pixel electrode 144, and a black matrix 315.

As illustrated in FIGS. 1, 6, and 7, the upper panel 200 may include an upper substrate 201.

Herein, the lower panel 100 of FIGS. 6 and 7 may further include the color filters R, G, and B and the black matrix 315, compared to the lower panel 100 of FIGS. 2 and 3. That is, referring to FIGS. 6 and 7, the color filters R, G, and B and the black matrix 315 may be disposed on the lower panel 100 rather than the upper panel 200. In more detail, as illustrated in FIGS. 6 and 7, the color filters R, G, and B may be disposed between the first protective layer 120 and the common electrode 130 and the black matrix 315 may be disposed on the second protective layer 220.

In particular, as illustrated in FIG. 7, the cell gap adjustment layer 188 may be disposed on the color filters R, G, and B. In this case, two different cell gaps may be formed in one pixel region by the cell gap adjustment layer 188. That is, the pixel region P in which the red color filter R is disposed may have two differently sized cell gaps as a result of the presence of cell gap adjustment layer 188.

For example, as illustrated in FIG. 7, a cell gap d1 between the lower substrate 101 and the upper substrate 201 in an area where the cell gap adjustment layer 188 has a thickness of 0 (i.e. is absent) is different from a cell gap d2 between the lower substrate 101 and the upper substrate 201 in an area where the cell gap adjustment layer 188 has a predetermined thickness larger than 0 (i.e. is present). In other words, the cell-gap adjustment layer 188 may be disposed only on a part of one pixel region, so that one pixel region may have two different cell gaps d1 and d2.

Accordingly, the transmittance of the red color filter R may be adjusted. That is, the transmittance of the red color filter R may be adjusted in accordance with the thickness of the cell gap adjustment layer 188. More specifically, transmittance may be adjusted by adjusting the proportion of the pixel region covered by layer 188, as well as its thickness.

Meanwhile, the cell gap adjustment layer 188 may be also formed on the pixel region P on which green and blue color filters G and B are formed. The cell gap adjustment layer 188 may be made of, for example, a material used for the first protective layer 120.

As described above, according to one embodiment of the present invention, the thickness of the cell gap adjustment layer 188 may be suitably adjusted in accordance with a corresponding color filter. Accordingly, the chromaticity coordinates may be corrected, thereby providing devices that are more capable of maintaining color balancing. Further, according to one embodiment of the present invention, one pixel region P on which one color filter is disposed may have at least two differently sized cell gaps, thereby enabling subtle adjustment one of any color filters.

Meanwhile, the lower substrate 101, the gate line GL, the gate electrode GE, the semiconductor layer 113, the ohmic contact layer 115, the source electrode SE, the drain electrode DE, the thin film transistor (TFT), the data line DL, the first protective layer 120, the common electrode 130, the cell gap adjustment layer 188, the second protective layer 220, the pixel electrode 144, and the liquid crystal layer 300 of FIGS. 6 and 7 may be consistent with those of FIGS. 2 and 3. Thus, any repeated configuration may be understood with reference to descriptions of FIGS. 2 and 3.

Further, the color filter and the black matrix 315 of FIGS. 6 and 7 may be substantially consistent with those of FIGS. 2 and 3 except for their locations and/or sizes/shapes. Thus, the repeated configuration may be understood referring to descriptions of FIGS. 2 and 3.

Figure 8:
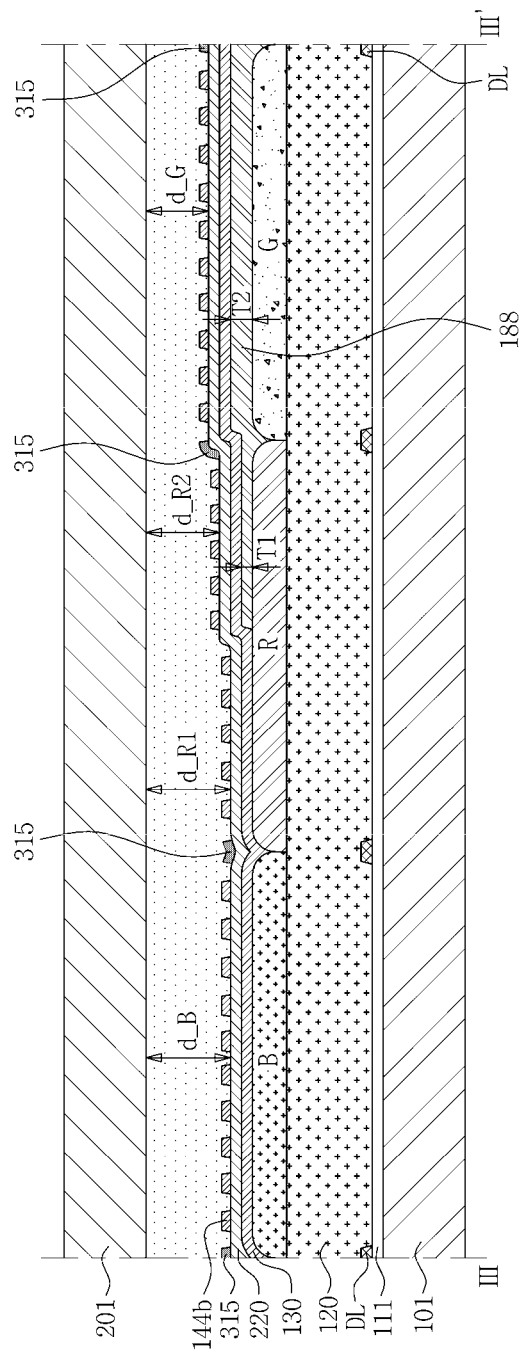
FIG. 8 is a cross-sectional view taken along the line III-III' of FIG. 4 according to another embodiment of the present invention.

FIG. 8 is a cross-sectional view taken along the line III-III' of FIG. 4 according to another embodiment of the present invention.

Referring to FIGS. 4 and 8, the cell gap adjustment layer 188 may have different thicknesses in different pixel regions. In more detail, the cell gap adjustment layer 188 in the first pixel region P1 in which the blue color filter B is disposed may have a thickness of 0, the cell gap adjustment layer 188 in a part of the second pixel region P2 in which the red color filter R is disposed may have a thickness of 0, the cell gap adjustment layer 188 in the other part of the second pixel region P2 may have a predetermined thickness larger than 0, and the third pixel region P3 in which the green color filter G is disposed may have a thickness larger than the predetermined thickness. Herein, the cell gap adjustment layer 188 may not be actually provided on the first pixel region P1 or part of the second pixel region P2. In this manner, the adjustment layer 188 may have specified thicknesses and/or distributions for each color of pixel region.

Referring to FIG. 8, the cell gap d_B may be the largest in the first pixel region P1 in which the blue color filter B is disposed and the cell gap d_G may be the smallest in the third pixel region P3 in which the green color filter G is disposed. Further, part of the cell gap d_R1 in the second pixel region P2 in which the red color filter R is disposed may be the same as the cell gap d_B in the first pixel region P1. Further, the other part of the cell gap d_R2 in the second pixel region P2 may be larger than the cell gap d_B in the first pixel region P1 and smaller than the cell gap d_G in the third pixel region P3.

Meanwhile, one layer may be made into the cell gap adjustment layers 188 having different thicknesses by a diffraction exposure process using a half tone mask.

In addition to the above, a coupling prevention film may be further provided between the data line DL and the common electrode 130 so as to prevent a coupling phenomenon between the data line DL and the common electrode 130. Hereinafter, the coupling prevention film will be described in detail with reference to FIG. 9.

Figure 9:
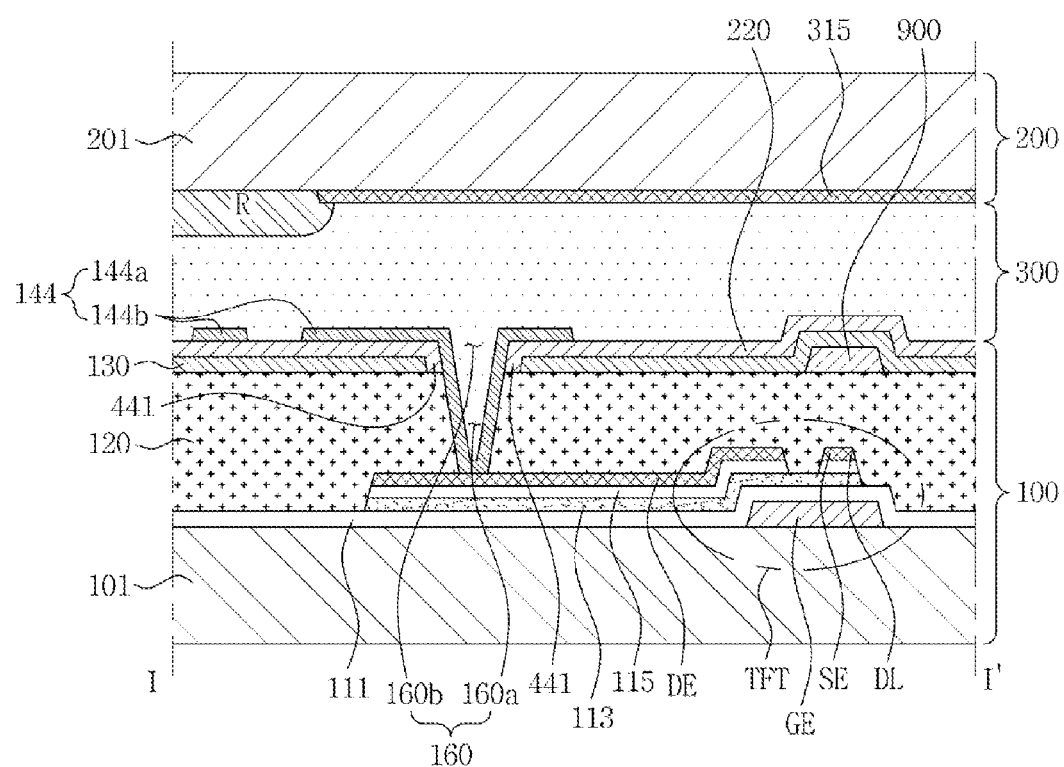
FIG. 9 is a cross-sectional view taken along the line I-I' of FIG. 1 according to yet another embodiment of the present invention.

FIG. 9 is a cross-sectional view taken along the line I-I' of FIG. 1 according to yet another embodiment of the present invention.

As illustrated in FIG. 9, the coupling prevention film 900 may be disposed between the data line DL and the common electrode 130. In more detail, after the first protective layer 120 is formed, the coupling prevention film 900 may be formed thereon. The coupling prevention film 900 may be formed of, for example, an organic material.

The cell gap adjustment layer 188 according to above embodiments of the present invention may alternatively be disposed on the upper substrate 201 rather than the lower substrate 101.

Meanwhile, although not illustrated, the cell gap adjustment layer 188 according to one embodiment of the present invention may be applied to a twist nematic LCD device and a vertical alignment LCD device. That is, the cell gap adjustment layer 188 may be applied to the nematic LCD device or the vertical alignment LCD device where the black matrix 315, the color filter, and the common electrode 130 may be disposed on the upper display substrate and the pixel electrode 144 may be disposed on the lower panel 100. In other words, and as would be understood by one of ordinary skill in the art, the adjustment layer 188 may be used in any LCD device to adjust its cell gap as desired.

From the foregoing, it will be appreciated that various embodiments in accordance with the present disclosure have been described herein for purposes of illustration, and that various modifications may be made without departing from the scope and spirit of the present teachings. Accordingly, the various embodiments disclosed herein are not intended to be limiting of the true scope and spirit of the present teachings. Various features of the above described and other embodiments can be mixed and matched in any manner, to produce further embodiments consistent with the invention.

What is claimed is:

1. An LCD device comprising:
    a first substrate;
    a gate line and a data line on the first substrate;
    at least one TFT connected to the gate and data lines and comprising source and drain electrodes;
    a pixel electrode connected to the TFT;
    a second substrate;
    a liquid crystal layer between the first and second substrates;
    a common electrode on one of the first and second substrates;
    a black matrix disposed on one of the first and second substrates and configured to define multiple pixel regions;
    color filters each disposed to correspond to one of the pixel regions, so that each pixel region is a region configured to display a single color; and
    a cell gap adjustment layer disposed on one of the first and second substrates so as to overlap at least one entire pixel region and partially overlap another one of the pixel regions so as to form different cell gaps within the another one of the pixel regions.

2. The LCD device of claim 1, wherein the cell gap adjustment layer has different thicknesses in the another one of the pixel regions.

3. The LCD device of claim 1, wherein the cell gap adjustment layer is disposed only in a part of the another one of the pixel regions.

4. The LCD device of claim 1, wherein the cell gap adjustment layer has different thicknesses in different pixel regions.

5. The LCD device of claim 1, wherein the cell gap adjustment layer is absent from at least one pixel region.

6. The LCD device of claim 1, wherein the cell gap adjustment layer comprises a material different from that of the color filter.

7. The LCD device of claim 1, wherein the cell gap adjustment layer comprises one of metal, organic and inorganic materials.

8. The LCD device of claim 1, wherein the black matrix, the color filter, and the common electrode are disposed on the second substrate.

9. The LCD device of claim 1, wherein:
    the black matrix and the color filter are disposed on the second substrate,
    the common electrode is disposed on the first substrate; and
    the pixel electrode comprises a plurality of branch electrodes.

10. The LCD device of claim 9, further comprising an insulating film between the pixel electrode and the common electrode.

11. The LCD device of claim 1, further comprising a coupling prevention film between the data line and the common electrode.

12. The LCD device of claim 11, wherein the coupling prevention film and the cell gap adjustment layer comprise the same material.

13. The LCD device of claim 1, wherein the black matrix, the color filter, and the common electrode are disposed on the first substrate.

* * * * *